April 6, 1954  L. F. STREET  2,674,104
MATERIAL-COOLING SYSTEM AND PROCESS
Filed March 11, 1950  2 Sheets-Sheet 1

INVENTOR.
Louis F. Street
BY
Frank A. Bower
ATTORNEY

April 6, 1954 — L. F. STREET — 2,674,104
MATERIAL-COOLING SYSTEM AND PROCESS
Filed March 11, 1950 — 2 Sheets-Sheet 2
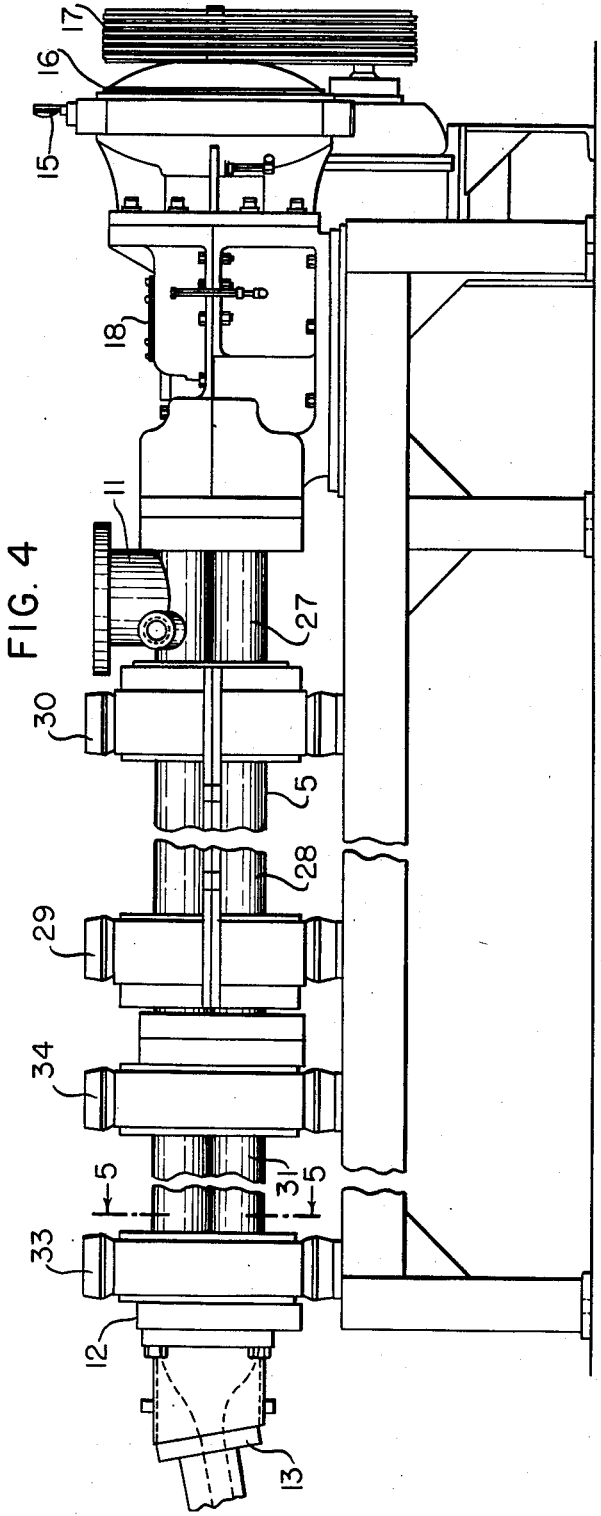
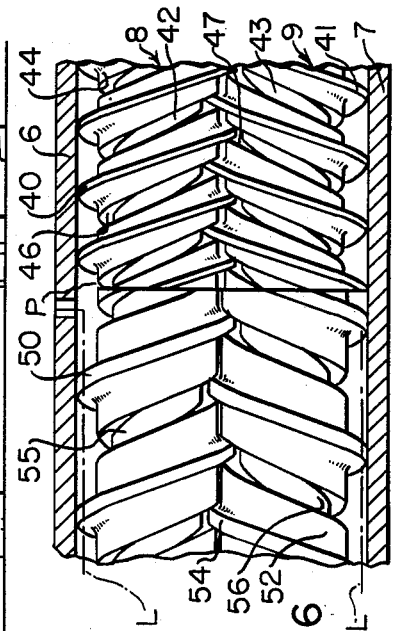
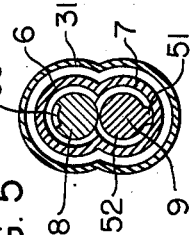
INVENTOR.
Louis F. Street
BY
Frank A. Bower
ATTORNEY Patented Apr. 6, 1954

2,674,104

UNITED STATES PATENT OFFICE 2,674,104

MATERIAL-COOLING SYSTEM AND PROCESS

Louis F. Street, Philadelphia, Pa., assignor to Welding Engineers, Inc., Norristown, Pa., a corporation of Delaware Application March 11, 1950, Serial No. 149,166

7 Claims. (Cl. 62—114)

This invention relates to the cooling of materials from a relatively fluid condition to a more solid form.

The object of the invention is to provide a method of progressively lowering the temperature of material while it is being moved from a supply to a discharge in a continuous line from end to end of the treatment.

Another object of the invention is to cool the material in its fluid state in a form most effectively applicable to this fluid condition and correspondingly provide a cooling action efficiently adapted to the resulting fluid condition of the partially cooled material.

Further objects of the invention, particularly in the provision of apparatus applying these cooling procedures while continuously feeding the material and discharging it in desirably cooled condition, will appear from the following specification taken in connection with the accompanying drawings in which:

Figs. 1, 2, and 3 are successive plan views, partly in section, of apparatus constructed in accordance with this invention;

Fig. 4 is an elevational side view of the apparatus shown in Figs. 1, 2 and 3;

Fig. 5 is a cross-sectional view taken on the line 5—5 of Fig. 4; and

Fig. 6 is an enlarged view of a portion of Fig. 2.

Figure 1:
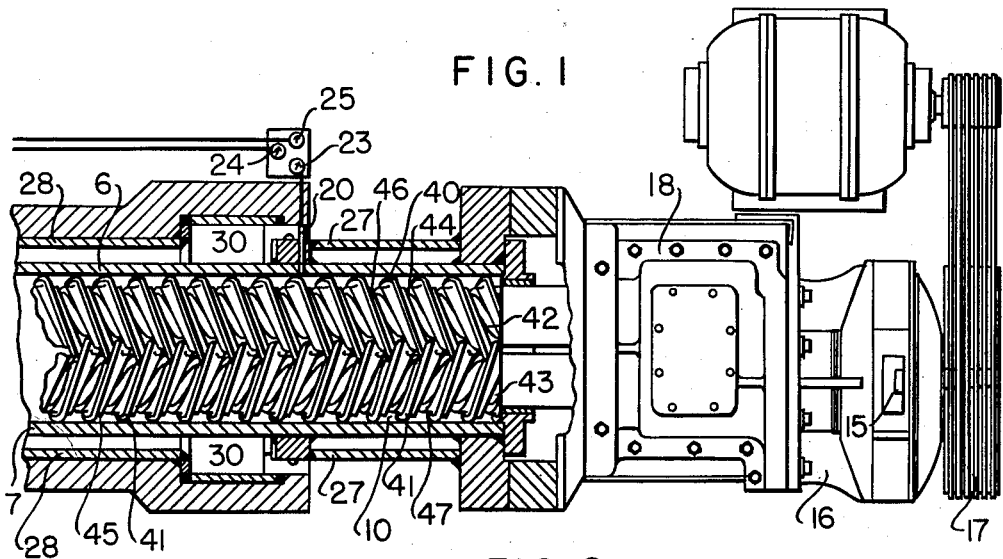
Figure 2:
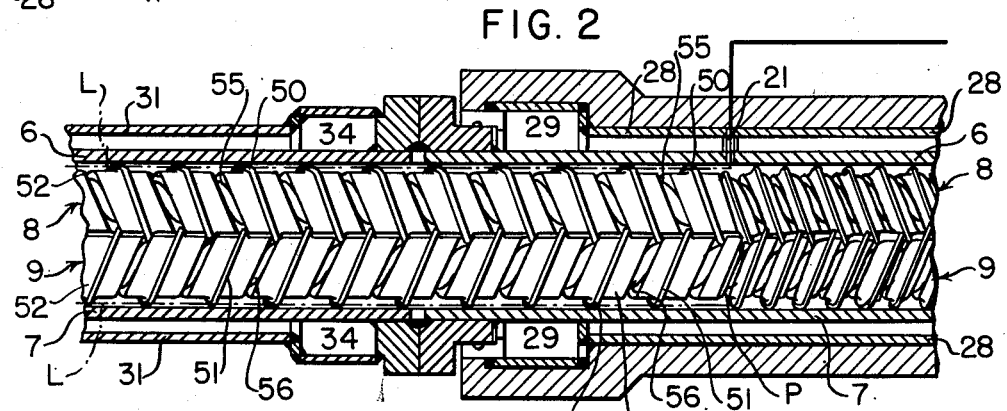
Figure 3:
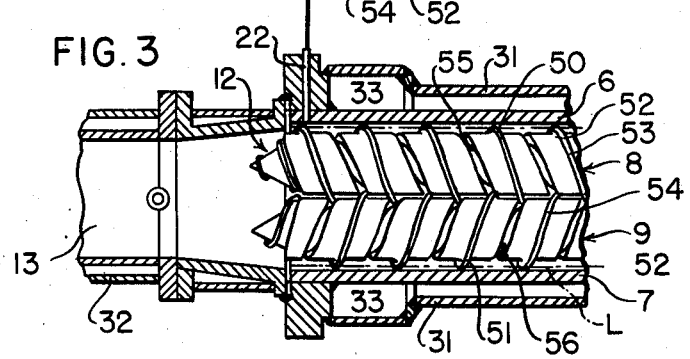

In cooling materials such as petroleum, waxes, paraffin, paradichlorobenzene and the like from a liquid to a plastic or solid state, the tendency of the cooled material to form intervening insulating layers has obstructed the cooling and rendered the operation inefficient and expensive, requiring large numbers of molds spaced over extensive areas and involving much labor in handling. To overcome these objections, the present system applies the cooling to a continuous stream of the material receiving, cooling and discharging it in an uninterrupted flow from inlet to outlet first reducing the temperature to the melting point and extracting this latent heat of fusion and then continuing the cooling of the material to the desired condition for discharge. In the control of the cooling actions, I have found it important to regulate the rate of feed and the temperature of the contacting surfaces according to the characteristics of the material operated on and in response to its reaction to the successive stages of the treatment. For instance, material on cooling may tend to build up a resistance which in turn augments the cooling effect by decreasing the rate of feed and these factors work together to decrease the output and overcool the product. Similarly, the material may tend to slip through without adequate cooling as the mass at the discharge remains too fluid. To meet these conditions and maintain the desired conditions of treatment and output, I have provided for automatic indication of the condition of the material at all times according to which the tendencies of the operation to develop variations may be promptly observed and the undesirable effects anticipated and avoided.

In the apparatus shown in the drawing, the cooling chambers are provided by a casing 5 formed as parallel intersecting cylinders 6, 7 with corresponding interfitted feed worms 8 and 9 receiving the liquid material at the rear end 10 from hopper 11 and discharging it in cooled condition at the outlet 12 which may be provided with die means as shown, for instance, at 13.

I have found it desirable to closely observe the characteristics of the cooling mass as it passes through the cooling process and the resistance of the material to the feed effort is a very informative guide as appearing for instance on the torque meter dial 15 of the torque drive 16 between the drive pulley 17 and the gear box 18 for the feed worms 8, 9. Also reflecting the temperature of the material being treated are the thermocouples 20, 21, 22 connected to indicate or record at 23, 24, 25 the readings at entrance, discharge and intermediate points. These readings combined with the indications on the torque meter dial 15 give a very close and accurate guide to the condition of the treated material enabling the operator to adjust the cooling or the rate of feed or both as demanded to maintain a steady maximum output of material in properly cooled condition.

At the hopper entrance portion of the casing 5, a jacket 27 is provided carrying a fluid circulation to either warm or cool the liquid material as it is received by the rear or entrance ends of the worms 8, 9. The cooling jacket 28 surrounds the intermediate portions of the casing cylinders 6, 7 and carries a cooling fluid preferably counter-flow entering at 29 and discharging at 30 and acting in general to carry the temperature of the material down to the fusion point and abstract all or most of the latent heat of fusion, the cooling being completed by the following jacket 31 and any jacket such as that indicated at 32 for the final die 13. The cooling fluid enters jacket 31 at 33 and leaves at 34, and the die jacket 28 has its inlet at 29 and its outlet at 30. Valves (not shown) are provided for the supplies to the jackets to separately regulate the respective flows.

I have found that, for most effective and efficient cooling, the liquid material above the point of solidification should be kept stirred in close proximity to the cooling surfaces. The heat is thus brought to the cooled parts by convection. To attain this, the flights 40, 41 of the rear worm portions 42, 43 are closely intermeshed with the hubs or stems 44, 45 of relatively large diameter and preferably grooved as shown at 46, 47 to mate with the worm flights 41, 40. The flights 41, 40 are double or triple, further accentuating the surface areas in contact with the material and the peripheries of these flights or threads 40, 41 are very close to the cooling surfaces of the cylinders leaving a bare running clearance and acting on each revolution of the worm to scrape off a film of chilled material from the cylinder surfaces. This scraping and stirring of the material accentuates the cooling action and gives an effective dissipation of the heat to the cooling medium in the jacket, using the chilled material to mix in with the still hot liquid, and keeping the worm flights in close proximity to the cooling surfaces to be chilled thereby.

This double threading of the feed worms is preferably carried for a sufficient length to abstract most or all of the latent heat of the material, i. e. to an intermediate point such as P (Fig. 1). The material is now in more nearly solid form at the temperature of fusion and with tendency to develop thicker heat insulating coatings and so to detract from the cooling effect. In this front end of the machine where a sufficient portion of the material has been solidified so that the mass acts as a plastic, most of the heat must be passed by conduction through the film lying between the stems of the worms and the cooling walls. The heat transfer properties of the material in this stage are also such that the thicker the film the more rapidly the removal of heat falls off. This drop in rate of cooling increases considerably more than in direct proportion to the increased thickness of the film. For example, a ¼" thick film will cool off to the desired point in much less than one-third of the time than a ¾" film will cool off to the same average temperature. Thus it is desirable in this portion of the machine to maintain as thin a film as practicable between the stem of the worm and the inner surface of the casing or, to state it in another way, it is desirable to have as large a diameter as possible in the stem of the worm in relation to a given size casing.

As shown in Fig. 1, the same type of flight formation is used beyond point P but with a single flight 50, 51 instead of double and the hubs or stems 52 may be increased in diameter and also the radii of the casing cylinders may be slightly contracted as indicated by the lines L—L, the peripheries of the worm flights 53, 54 being correspondingly modified together with the grooves 55, 56.

The machine shown in the drawings is substantially in proper proportions of the parts, the rear worms being, for instance, 2½" in diameter with 1⅞" hubs and 1⅜" groove diameters. The flight width is ⅛" and the groove width ¼". The flight length is nearly 30" double flight and 1" pitch. The front worms are 2½" in diameter with 1⅖" hubs and 1⅜" groove diameters, ¼" flight width ⅜" groove width, 30" flight length and 2" pitch single flight. Larger machines will of course have proportionately greater output.

The rate of rotation of the feed worms will depend on the temperature of the coolant and the characteristics of the material being treated. The cooling fluid may be an appropriate medium such as water, brine or liquid ammonia. With materials such as petroleum wax having a melting point of 131° F. and entering the machine at about 10° above the melting point, the rate of rotation of the feed worms was approximately 10 R. P. M. for cooling with water at about 40° to 46° F. With brine cooling or liquid ammonia, higher rates of rotation and output are obtainable.

In operation on such a material as paradichlorobenzene, where the material is carried in a hot mother liquor, the material moves through the machine in much the same manner as that described above and the speed of the rotation of the worms is adjusted to produce the most economical operation from the standpoint of getting a maximum over-all rate of production, that is, 40% crystallization may be acceptable with a high over-all through-put or 60% crystallization may be desired with a lower through-put. In such an operation as this, the material simply falls out of the machine in the form of a mush.

Enclosing plates are sometimes desired over the lower portion of the outlet end to form a dam and help retard the too rapid flow of material and liquids through the machine.

In operating the equipment on such a material as molten DDT, the entire mass of the material forms into crystals and is ejected from the front end of the machine as a granular substance like table salt in appearance.

To secure greatest cooling efficiency in handling paraffin, two conditions are sought after. In the back end of the machine where the apparatus is filled with molten wax or a mixture of molten and solidified wax which acts essentially the same as molten material, the removal of latent heat of fusion is the primary objective. The molten material in contact with the inner surface of the casing chills and becomes solidified in a film. Immediately after a worm flight has scraped this surface, the film starts to form and increases in thickness until the next flight again scrapes the surface. As soon as the film forms, it starts to provide an insulation against the removal of heat from the liquid wax on the inside and the thicker the film grows the greater its insulation effect. Thus, scraping this surface six times a minute may produce the scraping of a film .030" thick. If the frequency of scraping is increased to twelve times a minute, the total volume of wax scraped will be greater than previously because of the fact that the rate of growth of the film is greatest in the early stages of its formation and falls as the thickness increases. Thus, scrapings of 12 films of 20 to 25 thousandths of an inch thick might be obtained at the higher speed.

In the system of this invention, the material is carried in this helical ribbon form through a long path in contact with the chilled surfaces of the cylinders. This permits a relatively high rate of movement of the material with correspondingly large output and at the same time enables the control of the treatment to be precise with regulated uniform cooling to the desired final condition of the product. The operator observing the torque on the dial of torque drive 16 and the temperatures of the material on the indicators 23, 24 and 25 is informed of any tendency of the system to choke by overcooling or flood by undercooling. In response, the feed is varied by control of the rate of rotation to forestall aggravation of these conditions and to normalize the operation to the desired sequence. The cooling fluid for the jackets 27, 28, 31 may be adjusted as to temperature and/or quantity and these, coupled with the regulation of the feed rate, provide a very precise control of the manipulation and cooling of the material. While the heat of fusion has been referred to in this specification, the cooling action, of course, involves rather the heat of solidification and while these heat contents are not necessarily the same, they are substantially similar and throughout the specification and claims the heat of fusion is to be taken as meaning and covering also the heat of solidification during the cooling action.

I claim:

1. A system for cooling material from a liquid state to a desired condition of solidification comprising a casing formed with parallel intersecting chilled cylinders having bores of a length greater than twenty times their largest radii, feed worms rotating in each cylinder throughout the length thereof and having helical flight peripheries in scraping contact with the inner surfaces of said cylinders and having stem peripheries spaced apart a predetermined distance, the axial lead of the helical flights of the feed worms being not greater than the peripheral diameter thereof but more than one-half of said peripheral diameter, and means for oppositely rotating said feed worms at a rate moving material through said chilled bores and simultaneously stirring it for continuously new contacts with the cooling wall to abstract the latent heat of solidification of the material and subsequently reduce its temperature a predetermined amount below the melting point and then discharging said material in desired cooled condition.

2. A system for cooling material from a liquid state to a desired condition of solidification comprising a casing formed with parallel intersecting chilled cylinders having bores of a length greater than twenty times their largest radii, feed worms rotating in each cylinder throughout the length thereof and having helical flight peripheries in scraping contact with the inner surfaces of said cylinders and having stem peripheries spaced apart a predetermined distance, the helical flights of the earlier portions of the feed worms having a double lead and the remainder of the feed worms toward the discharge end of the apparatus having a single lead, and means for oppositely rotating said feed worms at a rate moving material through said chilled bores and simultaneously stirring it for continuously new contacts with the cooling wall to abstract the latent heat of solidification of the material and subsequently reduce its temperature a predetermined amount below the melting point and then discharging said material in desired cooled condition.

3. A system for cooling material from a liquid state to a desired condition of solidification comprising a casing formed with parallel intersecting chilled cylinders having bores of a length greater than twenty times their largest radii, feed worms rotating in each cylinder throughout the length thereof and having helical flight peripheries in scraping contact with the inner surfaces of said cylinders and having stem peripheries spaced apart a predetermined distance, the axial lead of the helical flights of the feed worms being not greater than the peripheral diameter thereof but more than one-half of said peripheral diameter, and means for oppositely rotating said feed worms at a rate moving material through said chilled bores and simultaneously stirring it for continuously new contacts with the cooling wall to abstract the latent heat of solidification of the material and subsequently reduce its temperature a predetermined amount below the melting point and then discharging said material in desired cooled condition, said rotating means comprising a variable speed drive for the feed worms including a torque device showing the actual torque applied between the drive and feed worms independently of the load.

4. A system for cooling material from a liquid state to a desired condition of solidification comprising a casing formed with parallel intersecting chilled cylinders having bores of a length greater than twenty times their largest radii, feed worms rotating in each cylinder throughout the length thereof and having helical flight peripheries in scraping contact with the inner surfaces of said cylinders and having stem peripheries spaced apart a predetermined distance, the axial lead of the helical flights of the feed worms being not greater than the peripheral diameter thereof but more than one-half of said peripheral diameter, and means for oppositely rotating said feed worms at a rate moving material through said chilled bores and simultaneously stirring it for continuously new contacts with the cooling wall to abstract the latent heat of solidification of the material and subsequently reduce its temperature a predetermined amount below the melting point and then discharging said material in desired cooled condition, said rotating means comprising a variable speed drive for the feed worms including a torque device between the drive and the feed worms and temperature-measuring means indicating successive temperatures of the material as it passes through the bores of the cooling cylinders.

5. A system for cooling material from a liquid state to a desired condition of solidification comprising a casing formed with hollow parallel intersecting chilled cylinders having bores of a length greater than twenty times their largest radii and having a surrounding jacket through which a chilling medium is circulated, feed worms oppositely rotating in each cylinder throughout the lengths thereof to advance and mix the material and having flight peripheries close to the inner surface of said cylinder and having cylindrical stem peripheries comprising more than half their total lengths and operating close to the chilled surfaces and spaced apart a predetermined distance from each other, the interruption to the continuity of the stream of material by the worm flights leaving at least eighty-five percent of the chilling surface of the casing unobstructed and available for the cooling of the material, and means for oppositely rotating said feed worms at a rate moving material through said chilled bores and simultaneously stirring it for continuously new contacts with the cooling wall reducing its temperature a predetermined amount below its melting point, and then discharging said material in desired cooled condition.

6. A process for cooling material from a liquid through a plastic range to a desired state of solidification comprising receiving a supply of said liquid material and feeding it longitudinally through a passageway in the form of parallel, continuous, cylindrical, thin-walled tubes, each tube formed by a helical ribbon of said material having an average thickness of the order of one-quarter of an inch and intersecting with the other ribbon and merging therewith along the median line of engagement between them, removing heat from the outer surface of the material as it is continuously stirred by the feeding operation so as to mix the warm and chilled portions thereof and bring new portions of material to the cooling outer periphery, continuing said treatment to reduction of the temperature of the material to the melting point and with the abstraction of the latent heat of solidification, then continuing said feeding of said chilled material as a plastic mass in said intersecting cylindrical thin-walled tubular formation, and cooling the material to a predetermined point of solidification while developing the necessary pressure to progressively advance the material, and discharging said material through an orifice in desired cooled condition.

7. A system for treating and feeding material comprising parallel cylindrical casings, feed worms therein having stems of relatively large diameter with generally cylindrical surfaces closely spaced to each other at the center to pass a thin layer of the material between them, helical feed flights extending outward from said cylindrical surfaces into close running clearance with the interior surfaces of each of said cylindrical casings, grooving in the said cylindrical stem of each feed worm receiving the said helical flight of the other feed worm, and means for rotating said feed worms to advance the material in the form of helical ribbons merging at the center.

References Cited in the file of this patent

UNITED STATES PATENTS

| Number | Name | Date |
|---|---|---|
| 1,374,858 | McComb | Apr. 12, 1921 |
| 1,449,458 | Sutermeister | Mar. 27, 1923 |
| 1,666,804 | Willmann | Apr. 17, 1928 |
| 2,094,354 | Genova | Sept. 28, 1937 |
| 2,268,905 | Schaub et al. | Jan. 6, 1942 |